(No Model.) 3 Sheets—Sheet 3.
L. P. SCHRADER.
CULTIVATOR FOR LISTED CORN.
No. 482,321. Patented Sept. 6, 1892.
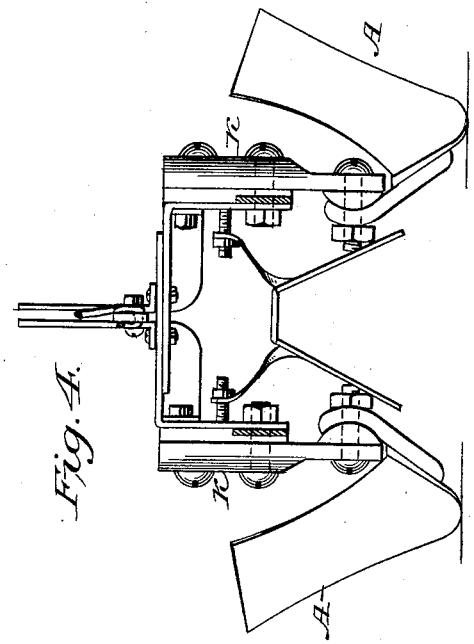
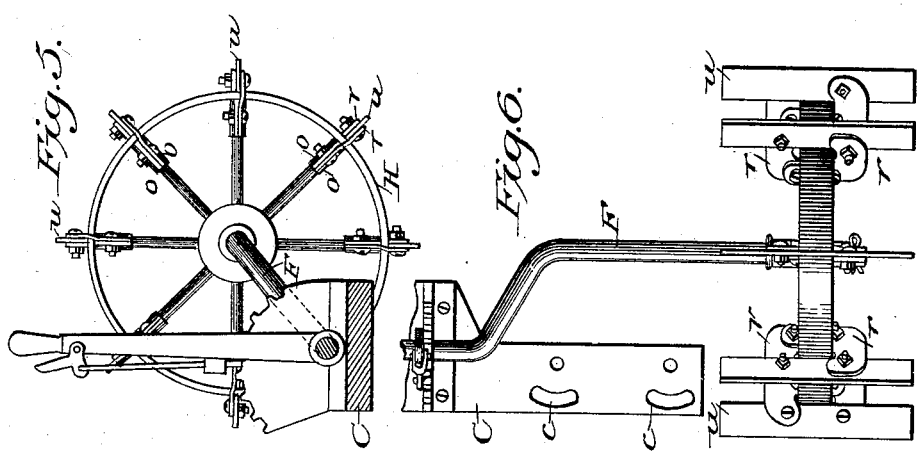
Witnesses.
John A. Morrison
H. B. Morrison
Inventor.
Lambert P. Schrader
By Hy. W. Stackpole
His Att'y

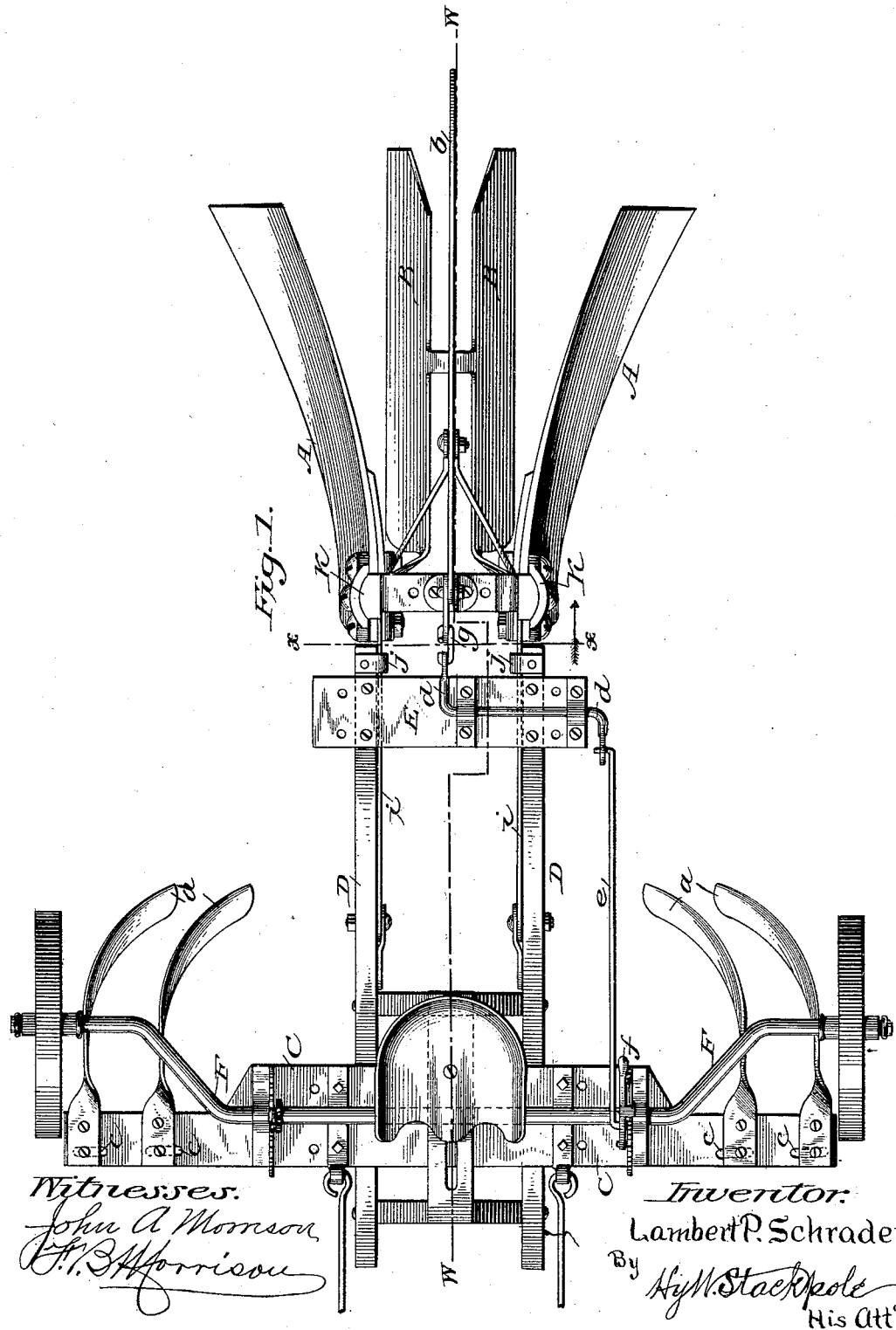

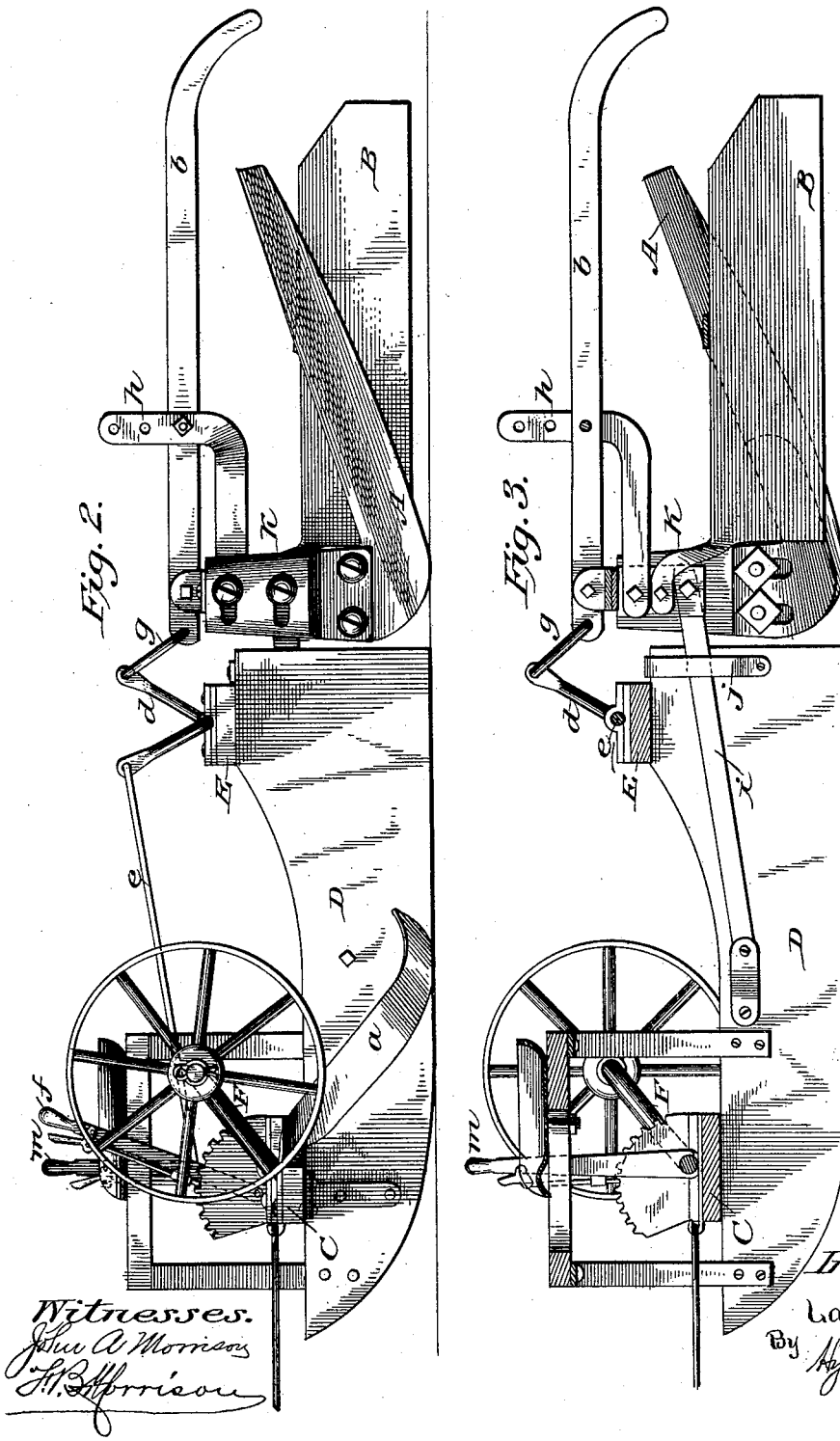

UNITED STATES PATENT OFFICE.

LAMBERT P. SCHRADER, OF CLAY CENTRE, KANSAS, ASSIGNOR OF ONE-HALF TO JOHN C. JOHNSTON, OF SAME PLACE.

CULTIVATOR FOR LISTED CORN.

SPECIFICATION forming part of Letters Patent No. 482,321, dated September 6, 1892.

Application filed October 26, 1891. Serial No. 409,771. (No model.)

*To all whom it may concern:*

Be it known that I, LAMBERT P. SCHRADER, a citizen of the United States, residing at Clay Centre, in the county of Clay and State of Kansas, have invented certain new and useful Improvements in Cultivators for Listed Corn; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cultivators for listed corn; and the objects are to construct a cultivator which, while thoroughly pulverizing the soil near the plants, shall, by being properly provided with outer knives, cut and thoroughly destroy all the weeds between the rows, and at the same time the implement be completely adjustable in all its parts.

These objects I attain by means of the mechanism hereinafter described, and illustrated in the accompanying drawings, in which—

Figure 1 is a plan of my invention; Fig. 2, a side elevation of same; Fig. 3, a longitudinal sectional elevation thereof on a line with the dotted line W W in Fig. 1; Fig. 4, a cross-sectional elevation through the dotted line X X, showing the rear portion of my invention. Figs. 5 and 6 are respectively side and end views of one of the carriage-wheels, showing knives attached thereto.

Similar letters of reference refer to similar parts throughout the several views.

D D are runners; C, a cross-head; F, the axle secured to the cross-head; E, a cross-block; A A, cultivator-knives; K K, means of adjusting said knives as patented to me November 11, 1890, and numbered 440,578. The rear portion shown in Fig. 4 is raised or lowered by means of crank-lever $d$, connected therewith by link or loose joint $g$ and with lever-handle $f$ by rod $e$. A plow-handle $b$ is also secured to said rear portion for the same purpose when the operator is at the rear of the implement. Said cross-head and the forward end of said runners may be raised or lowered on said axle at will by means of lever $m$, secured thereto and connected with said cross-head. Draft-bars $i$ $i$, aided by stays $j$ $j$, serve to prevent crowding in of said knives and lateral sliding of said rear portion while permitting the free raising and lowering of the same. Knives $a$ $a$, curved inwardly, are secured to the outer ends of the cross-head C for the purpose of cutting the weeds and stirring the soil beyond the reach of knives A A and of moving such soil toward the plants. Slots $c$ $c$ in the cross-head admit of the angular adjustment of said knives $a$ $a$.

It will be observed that additional bolt-holes are provided in the cross-head and block and the bridge connecting the rear knives for the purpose of enabling the operator to spread the runners and knives when desired.

Fender B is secured in place by means of ears attached to bolts inserted in the castings K K, said ears swinging freely on said bolts to permit the fender to follow the uneven surface over which it travels.

Where the weeds are large and consequently more difficult to destroy, I secure knives $u$ $u$ to wheels H H and slide said wheels inward on the axle F, knives $a$ $a$ having been previously removed. Said knives $u$ $u$ are secured to said wheels by means of clamps $o$ $o$, fitting the spokes of said wheels and bolted thereto. Projections $r$ $r$ extend above the periphery of the wheel, to which projections the said knives are securely bolted, as shown, forming a firm immovable attachment.

Having thus described my invention, what I claim as new, and desire to secure by Letters Patent, is—

1. In a cultivator, the combination of a crank-axle and wheels with the runners having adjustable knives attached to the rear thereof, substantially as shown and described.

2. In a cultivator for listed corn, the combination, with runners D D, of the crank-axle and wheels, rear knives A A, connected with said runners by means of draft-bars $i$ $i$, and crank-lever $d$ and link $g$ for regulating the depth of said knives in the soil, substantially as shown and described.

3. In a cultivator for listed corn, the combination, with the cranked axle and wheels, of runners D D, cross-head C, knives $a\ a$, secured to said cross-head, rear knives A A, and lever $d$ for regulating the depth thereof, substantially as shown and described.

4. In a cultivator for listed corn, the combination, with adjustable knives A A operated by lever $d$, of knives $u\ u$, secured to the periphery of carriage-wheels H H, substantially as and for the purposes set forth.

In testimony whereof I affix my signature in presence of two witnesses.

LAMBERT P. SCHRADER.

Witnesses:
 E. E. HOOPES,
 T. SCOTT MORRISON.